Aug. 16, 1960    E. LEVINE    2,949,211
METHOD AND SYSTEM FOR MAKING SEPARABLE
BOTTOM STOPS FOR SLIDE FASTENERS
Filed April 29, 1957    7 Sheets-Sheet 5
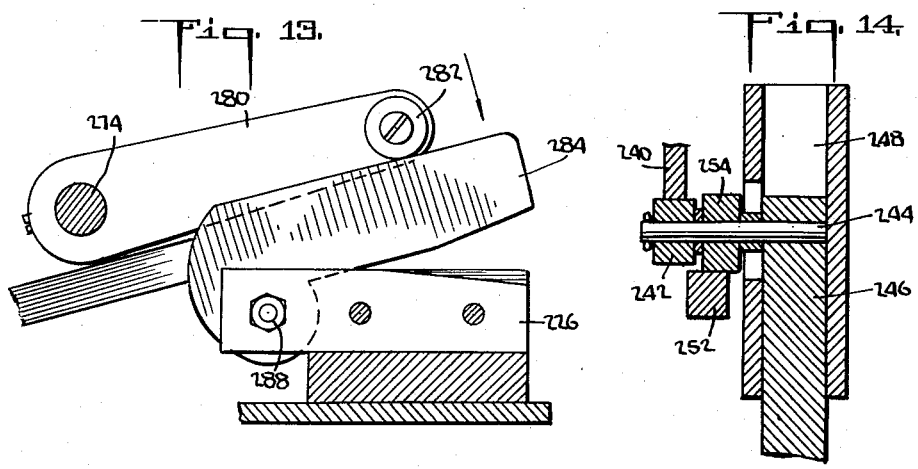
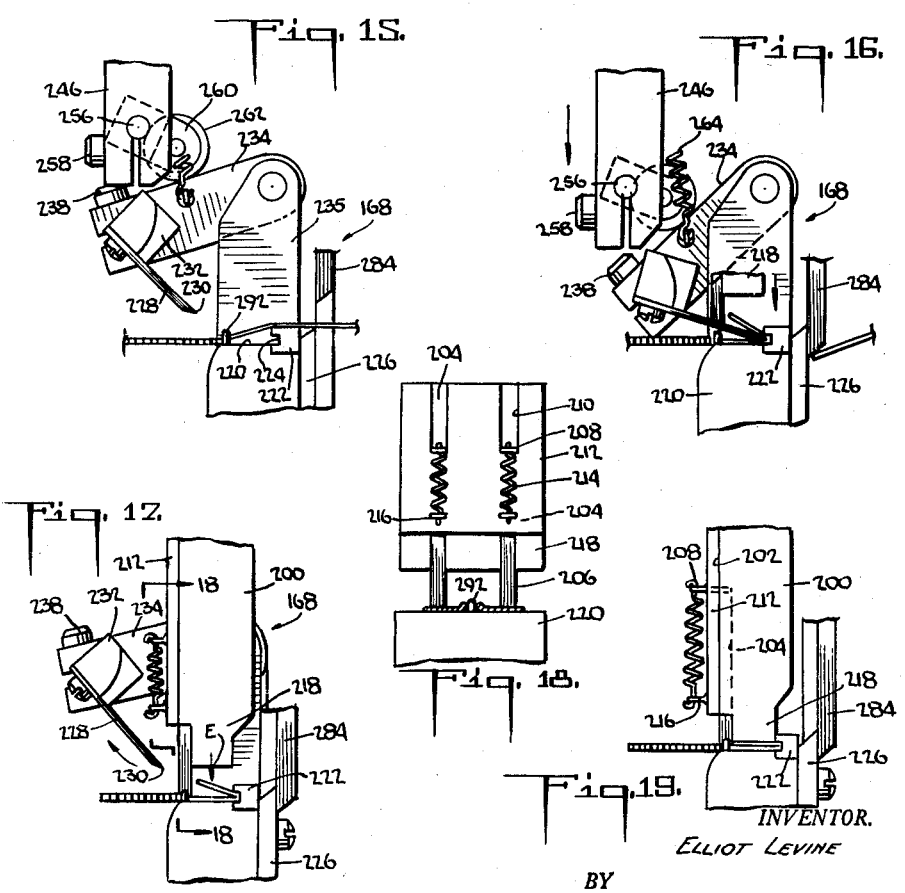
INVENTOR.
ELLIOT LEVINE
BY
ATTORNEYS

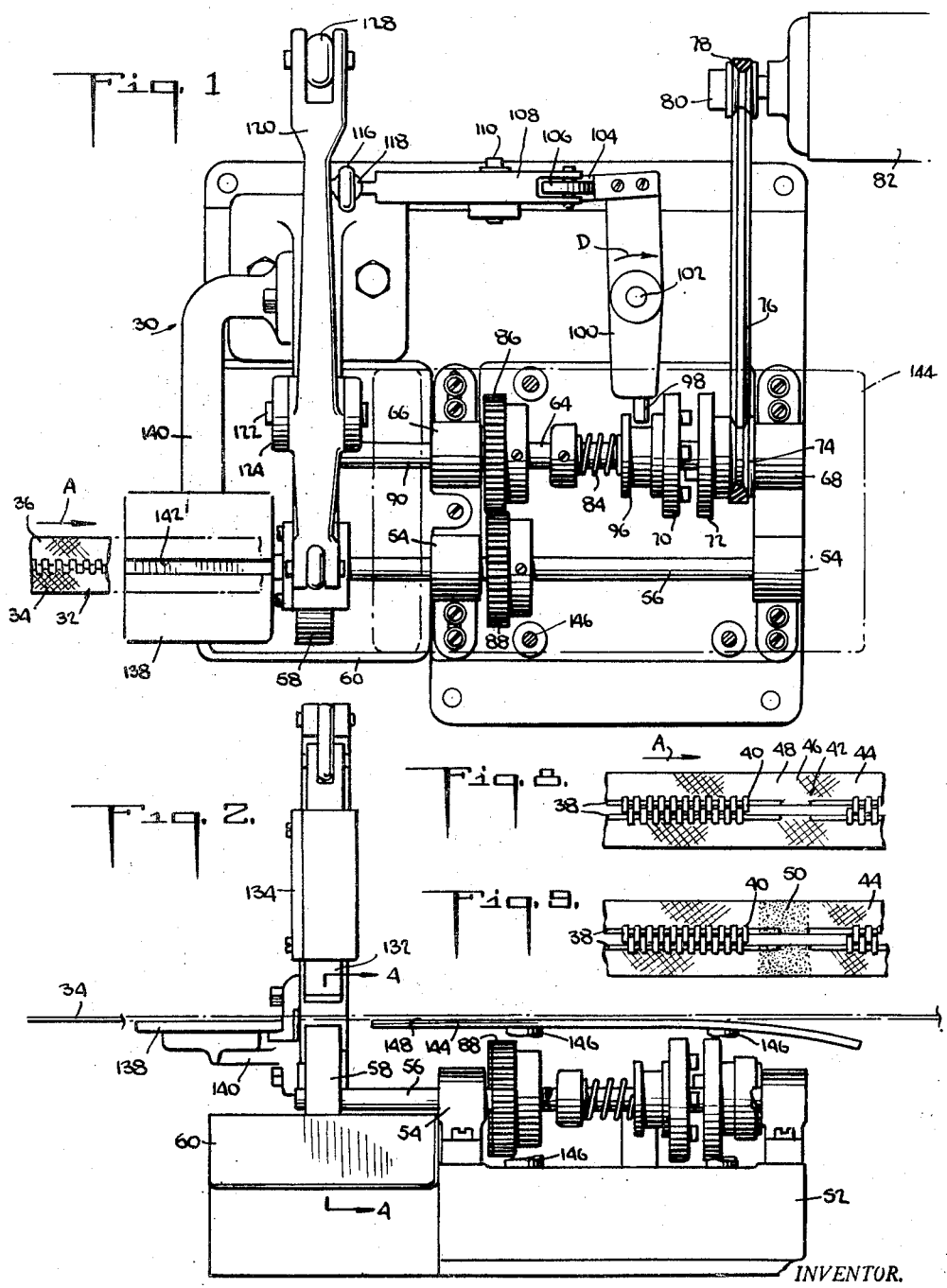

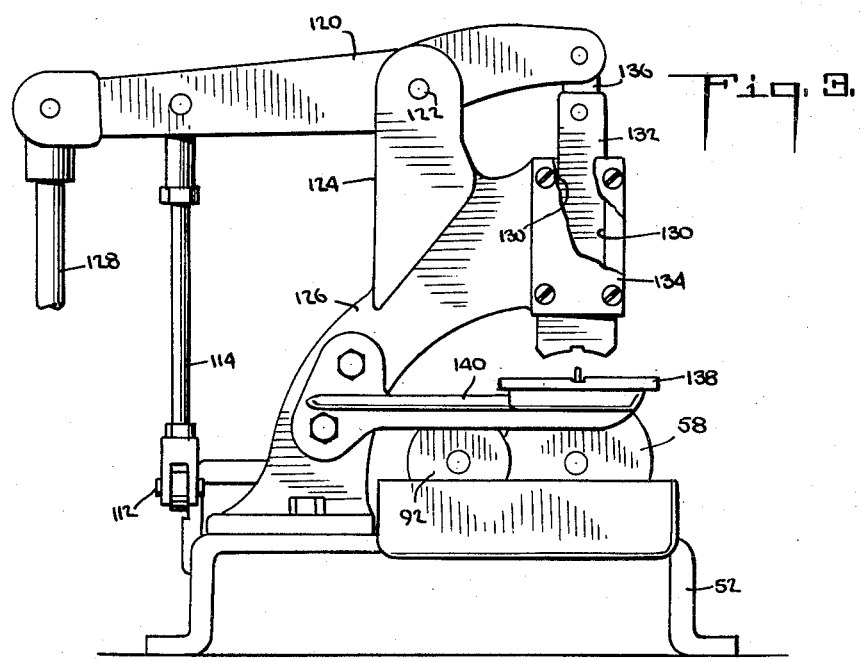
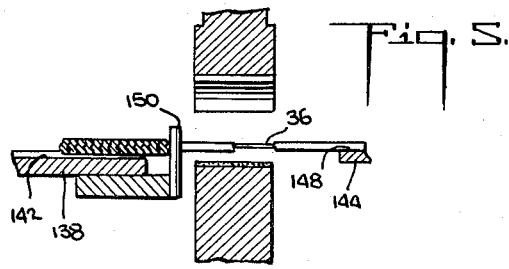
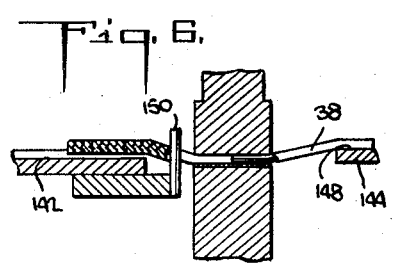
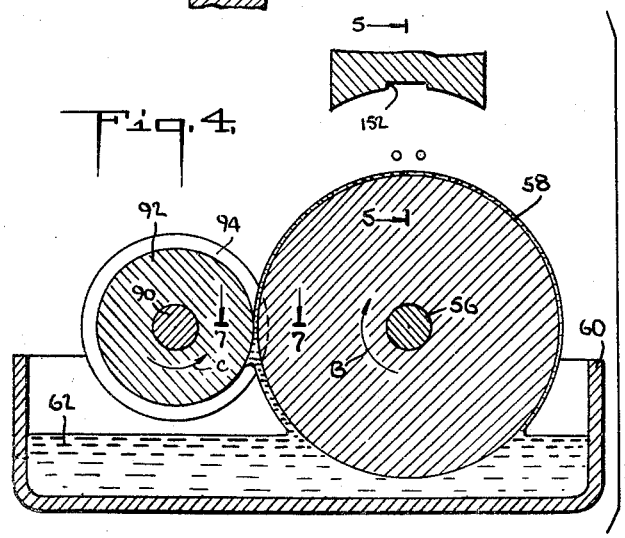
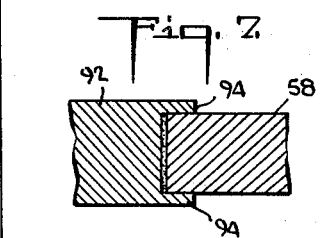
INVENTOR.
ELLIOT LEVINE

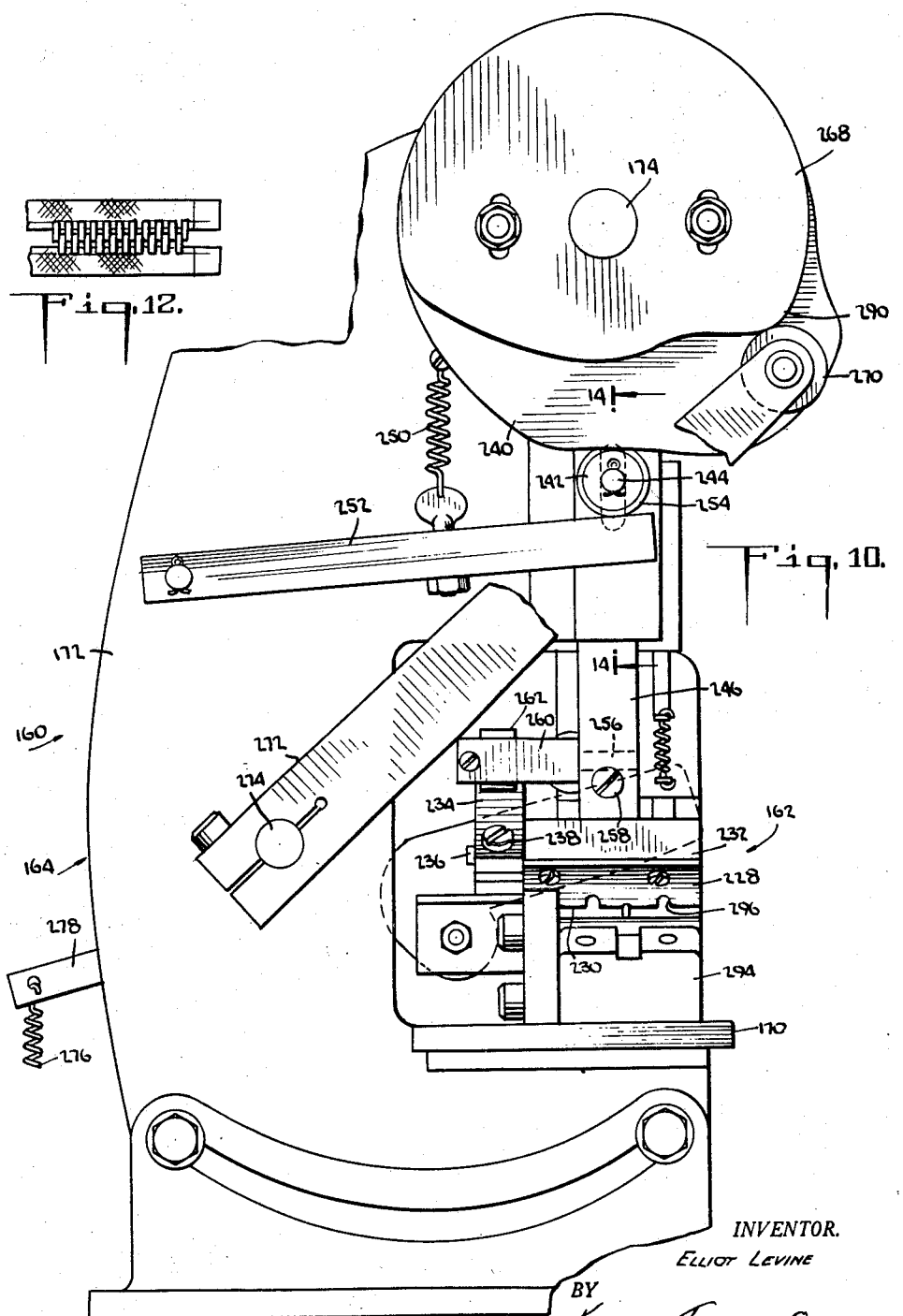

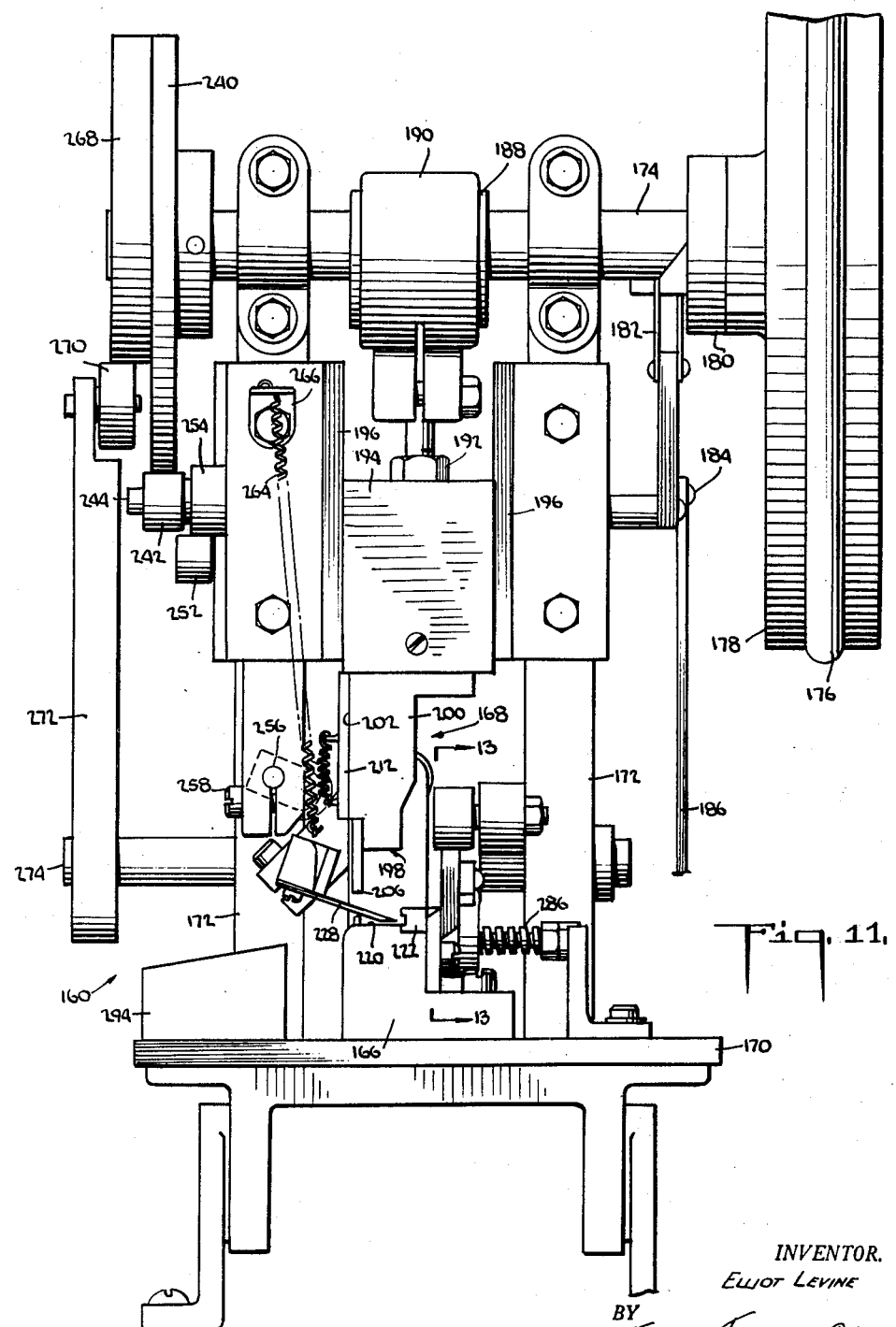

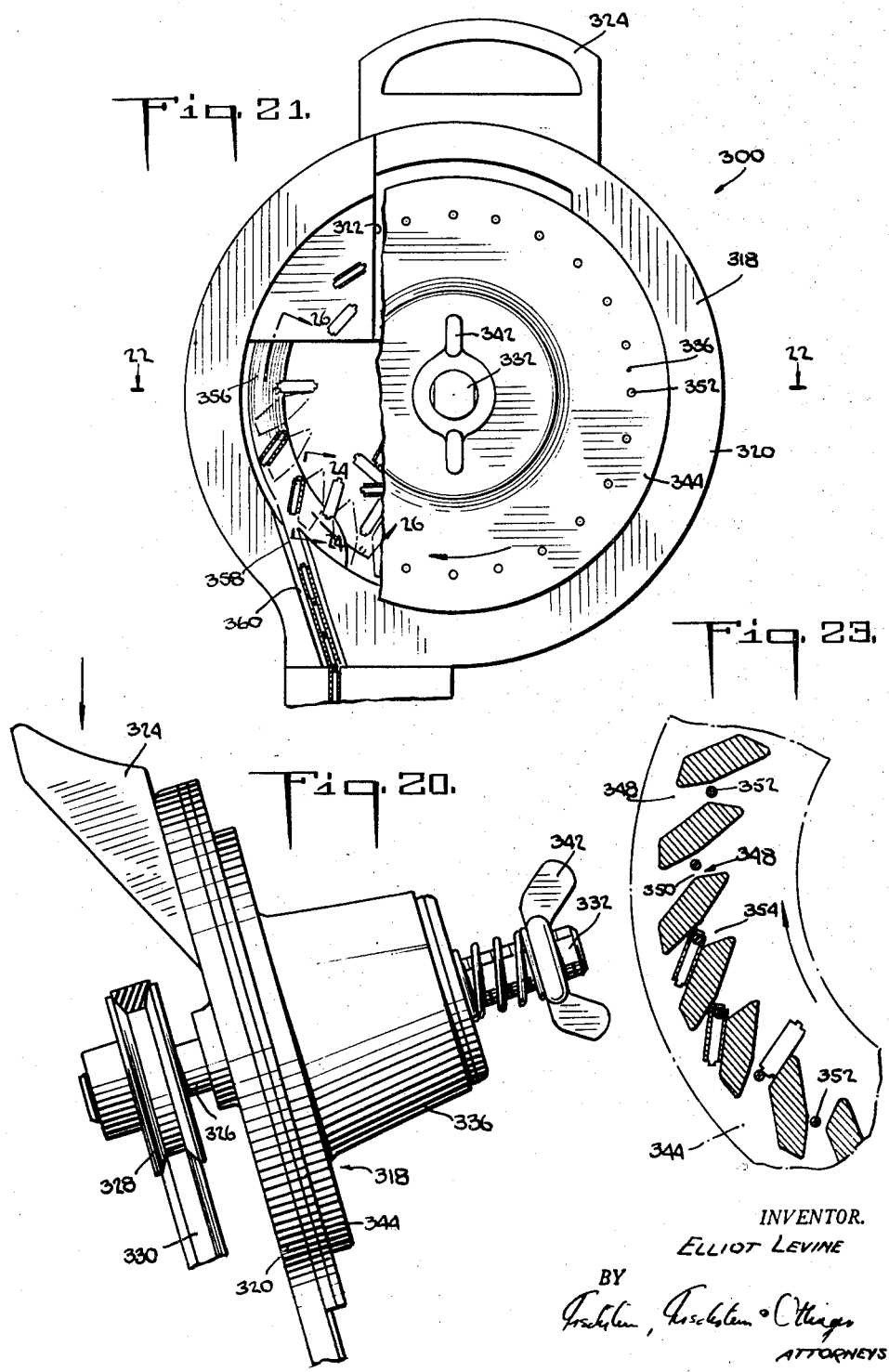

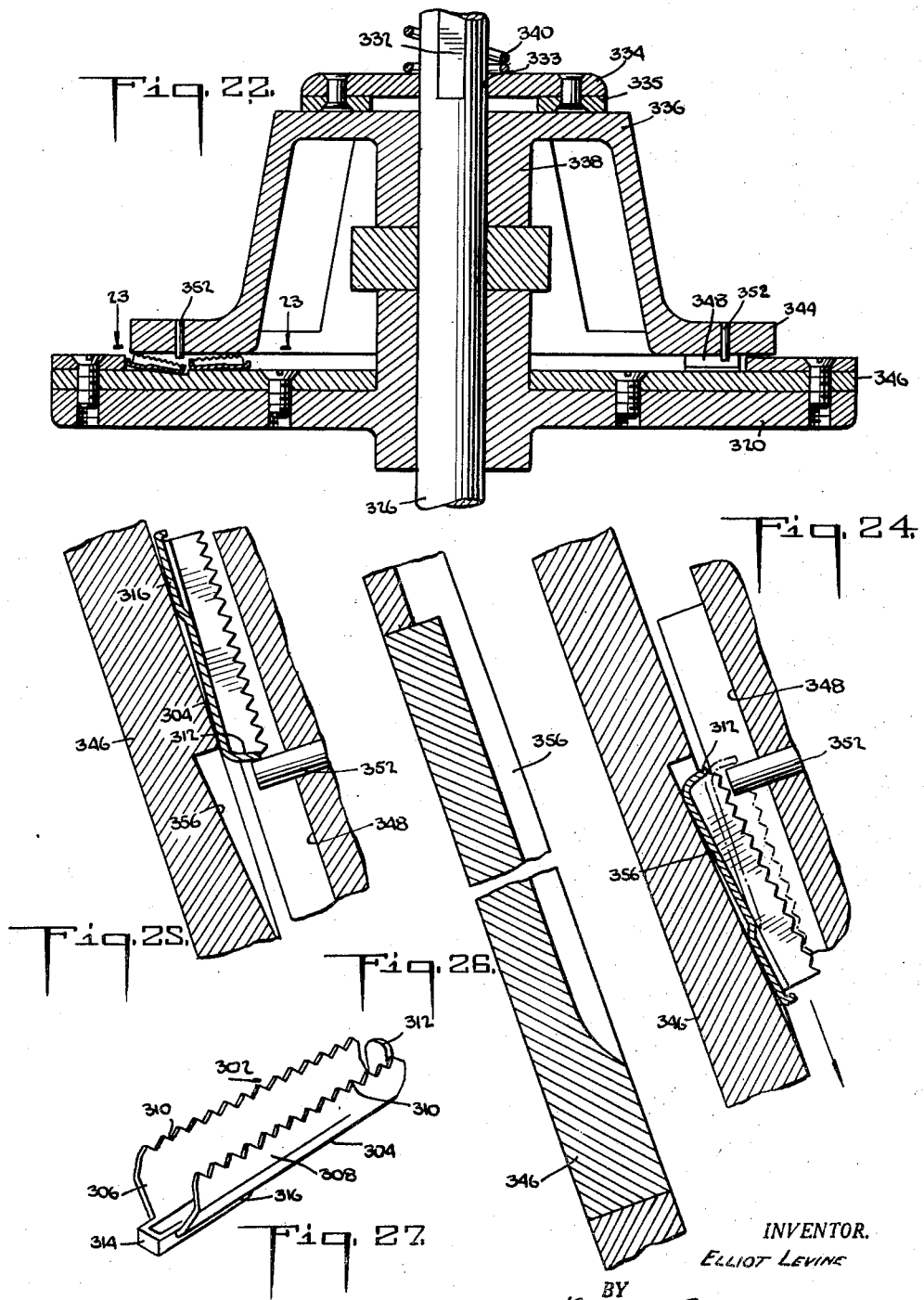

United States Patent Office
2,949,211
Patented Aug. 16, 1960

2,949,211

METHOD AND SYSTEM FOR MAKING SEPARABLE BOTTOM STOPS FOR SLIDE FASTENERS

Elliot Levine, Brooklyn, N.Y. (% American Eyelet Co. Inc., 225 Varick St., New York 14, N.Y.)

Filed Apr. 29, 1957, Ser. No. 655,883

4 Claims. (Cl. 221—169)

This invention relates to a method and system for making bottom stops for separable slide fasteners. More particularly, the invention pertains to a machine for preparing stringers for reception of bottom stop pins and to a system for attaching said pins. The term "pins" as used in this art denotes both the so-called "male" pin which is adapted to be detachably coupled with a socket and the so-called "female" pin which is adapted to support the socket.

It is an object of the present invention to provide a method and system of the character described which will simplify and render less expensive the manufacture of separable bottom stops for slide fasteners.

It is another object of the invention to provide a method and system of the character described which are considerably less complex and therefore easier to operate and practice than the machines and processes heretofore employed for the same purpose whereby less skilled labor can be employed.

It is another object of the invention to provide a method and system of the character described, which automate many steps in the manufacture of stops of the type here under consideration.

Other objects of the invention in part will be obvious and in part will be pointed out hereinafter.

The invention, accordingly, consists in the features of construction, combinations of elements, arrangements of parts and series of steps which will be exemplified in the machine and process hereinafter described and of which the scope of application will be indicated in the appended claims.

In the accompanying drawings, in which is shown one of the various possible embodiments of the invention, Fig. 1 is a top view of one of the machines used in the new system, to wit the machine for applying a cementitious substance as a stripe extending transversely across a pair of coupled stringers;

Fig. 2 is a front view of the machine shown in Fig. 1;

Fig. 3 is a side view of said machine;

Fig. 4 is an enlarged sectional view taken substantially along the line 4—4 of Fig. 2, the same illustrating the cementing and doctor drums and the applicator pressure pad;

Fig. 5 is a sectional view taken substantially along the line 5—5 of Fig. 4 and showing the machine as it appears prior to the application of cement to the stringer tapes.

Fig. 6 is a view similar to Fig. 5, but showing the machine during application of the cement stripe;

Fig. 7 is a sectional view taken substantially along the line 7—7 of Fig. 4;

Figs. 8 and 9 are plan views of a pair of coupled stringers before and after, respectively, the application of the lateral cement stripe;

Fig. 10 is a side view of a machine for separating the endmost pair of coupled stringers from a supply of such stringers and for doubling the cement carrying ends thereof;

Fig. 11 is a front view of the machine shown in Fig. 10;

Fig. 12 is a plan view of the endmost pair of coupled stringers after the previously endmost pair of coupled stringers have been separated therefrom and the new endmost pair has had the ends of its tapes doubled;

Fig. 13 is an enlarged sectional view taken substantially along the line 13—13 of Fig. 11, the same illustrating the severing mechanism for cutting off the endmost pair of coupled stringers;

Fig. 14 is an enlarged sectional view taken substantially along the line 14—14 of Fig. 10, the same illustrating the driving train for the tape folding mechanism;

Fig. 15 is a front view of the tape folding and severing mechanisms which constitutes the principal operative components of the machine shown in Figs. 11 and 12, the aforesaid mechanisms being shown at the beginning of a folding and severing cycle;

Fig. 16 is a view similar to Fig. 15 but showing the mechanisms after severing and during folding;

Fig. 17 is a view similar to Fig. 16 but at a later stage and showing the folding mechanism after retraction of the folding blade;

Fig. 18 is a sectional view taken substantially along the line 18—18 of Fig. 17;

Fig. 19 is a view similar to Fig. 17 but at a still later stage and showing final pressure being applied to the folded tapes;

Fig. 20 is a side view of the hopper for sorting and feeding male or female separable fastener pins to prepare them for mounting on the beaded edge of a folded slide fastener tape;

Fig. 21 is a partial fragmentary front view of the hopper shown in Fig. 20;

Fig. 22 is an enlarged sectional view taken substantially along the line 22—22 of Fig. 21;

Fig. 23 is an enlarged fragmentary sectional view taken substantially along the line 23—23 of Fig. 22;

Fig. 24 is an enlarged fragmentary sectional view taken substantially along the line 24—24 of Fig. 21, the same illustrating the sorting action of the hopper as it passes a properly positioned separable fastener pin;

Fig. 25 is a view similar to Fig. 24 but showing the hopper detaining an improperly positioned separable fastener pin;

Fig. 26 is an enlarged sectional view taken substantially along the line 26—26 of Fig. 21; and Fig. 27 is an enlarged perspective view of a separable fastener male pin.

In general the present invention deals with the treatment of coupled slide fastener stringers in the form in which they usually are fabricated in gap type chain machines, the treatment being such as to successively separate consecutive pairs of coupled stringers from long strips of the same, double and cement a set of ends of said stringers, and attach pins to the tape edges of the doubled ends so as to prepare them for use in connection with a separable bottom stop. Basically the invention is achieved by a system consisting of machines for operating upon the coupled stringers in succession. More particularly, said system includes three machines of which the first applies a stripe of cement across the ends of successive pairs of coupled stringers while the stringers still are connected to one another in the form of long strips, of which the second severs one after another a pair of coupled stringers from the strips and doubles and cements the ends of the endmost coupled stringers remaining on the strips, and of which the third attaches pins to the doubled ends of the severed pairs of coupled stringers. Each of these machines and the method of its operation is such that the step practiced therein is highly automated thereby increasing the speed of production and lowering the cost thereof.

Referring now in detail to the drawings, and more particularly to sheets 1 and 2 and Figs. 1–9, the reference numeral 30 denotes the first of the three machines, that is to say, the machine for cementitiously transversely striping long strips of coupled stringers at specific locations in the gaps thereof. As is well known, a conventional gap type chain machine will form a very long strip consisting of a tape having closely spaced slide fastener elements secured to a beaded edge thereof in groups which are spaced apart by gaps. It is usual to couple matched groups of slide fastener elements of two such long strips of stringers and to suitably arrange the coupled long strips in such a fashion as to form a source of supply of connected coupled stringers. These tapes may, for example, be arranged in a roll or laid in regular fashion in a large container.

The reference numeral 32 denotes a pair of long strips such as described above, the same including a pair of long tapes 34, 36 each having a beaded edge 38 on which one or a pair of cords are suitably secured, as by stitching. Groups of slide fastener elements 40 are clinched on the beaded edges of the strips and matched groups on the two tapes are coupled as shown, for example, in Fig. 8. Each strip consists of a very large number of such groups. Successive groups of coupled slide fastener elements are separated from one another by gaps 42 on which no elements are secured to the tapes.

Prior to treatment by the machine 30 the coupled stringers have had a portion of the cords removed from their beaded edges in the gaps 42. Said gaps 42 constitute in part one end of one pair of coupled stringers and in part the opposite end of the adjacent pair of coupled stringers.

More particularly referring to Fig. 8, in which the arrow A indicates the direction in which the stringers are fed into the machine 30, the gap 42 may be considered to consist of three sections. These include a section 44 which constitutes the top end of a pair of coupled stringers adapted to be connected at their other end by a separable bottom stop, a section 46 and a section 48. The sections 46 and 48 jointly constitute that end of a pair of coupled stringers which is adapted to receive, after suitable treatment, a separable bottom stop. The section 48 is immediately adjacent the groups of slide fastener elements on the stringers while the section 46 is more remote therefrom. The section 46 is designed to be folded back over the section 48 and to this end, in order to prevent undue thickening of the beaded edges, it is desirable for the cords to be removed from said section 46. This cord removing operation is performed before the coupled stringers are fed into the machine 30.

The function of the machine 30 is to apply transversely across the coupled stringers a wide stripe 50 (see Fig. 9) of cementitous material, preferably of the pressure sensitive type as, for example, rubber cement, the same consisting of natural latex in an organic volatile solvent and optionally including a tackifying agent. The stripe extends across the width of the coupled stringers from one lateral edge to the other thereof with one side of the stripe at the end of the section 46 remote from its groups of coupled slide fastener elements and the other side of the stripe in section 48 whereby when the section 44 later is separated from the section 46 and the section 46 folded over on to the section 48 these latter two sections will adhere to one another.

The machine 30 constitutes a base 52 which desirably is mounted on the top of a table or workbench. Bearings 54 secured to the base rotatably journal a shaft 56 which carries a cementing drum 58. The drum end of the shaft overhangs a cement reservoir 60 in which there is contained a supply of liquid cement 62 such as, for instance, rubber cement. The drum has a lower portion thereof submerged in the supply of cement whereby when the drum is turned it will carry a film of cement up on its periphery.

A shaft 64 parallel to the shaft 56 is journaled in bearings 66, 68 alongside the bearings 54. Said shaft 64 carries a pair of clutch halves 70, 72. The driving half 72 is free to rotate on the shaft 64. A sheave 74 is connected to the driving half 72 and has trained about it a belt 76 that engages a pulley 78 mounted on the output shaft 80 of an electric motor 82 that is secured on the table top whereby the driving half of the clutch constantly rotates.

The driven half 70 of the clutch is axially slidable on a splined section of the shaft 64 and is urged by a spring 84 into engagement with the driving half 72 whereby as long as the motor 82 is energized and the machine is not manipulated the shaft 64 will be continuously turned.

Power is transmitted from the shaft 64 to the shaft 56 by a pair of meshing gears 86, 88 fast on the shafts 64, 56 respectively. Desirably, the two gears are of substantially the same diameter and have the same number of teeth so that these two shafts will rotate at the same angular rate of speed.

The shaft 64 includes a portion 90 which overhangs the cement reservoir 60. This portion carries a doctor drum 92, which turns with the shaft 64 and is located immediately adjacent the cementing drum 58 with their axes of rotation at the same horizontal level. The space between the two drums is closely controlled and is regulated so that the film of liquid cement carried up from the reservoir by the cementing drum and past the doctor drum is of the proper thickness to apply the desired amount of liquid cement in the area of the stripe 50 to a pair of coupled stringers.

The doctor blade is provide with flanges 94 (see particularly Fig. 7) which rub against the opposite flat faces of the cementing drum so as to wipe clean the sides of the drum and thereby prevent the application of too great an amount of cement at the sides of the stripe 50.

It will be observed that the shaft 56 turns the cementing drum in the direction of the arrow B so as to raise a peripheral film of cement above the level of the cement in the reservoir and so that the doctor blade is turned by the shaft 90 in the direction of the arrow C. But since the two shafts 56, 90 turn at the same angular rate of speed and since the cementing drum is considerably larger than the doctor drum, the periphery of the cementing drum will move faster than that of the doctor drum, sweeping past the doctor drum and leaving the excess of cement on the doctor drum so as to reduce the thickness of the film of cement to the desired amount.

Inasmuch as the clutch normally is coupled, the foregoing action will be carried on continuously so that fresh liquid cement always is present as a uniform thin film on the top of the cementing drum ready to be applied, as needed, to a pair of coupled stringers.

During the actual application of cement to a pair of coupled tapes the cementing drum must be stationary, and for this purpose there is provided suitable means to interrupt the drive of the shaft 56, as by opening the clutch above described. More particularly, the driven half 70 of the clutch is formed with an annular track 96 in which a pin 98 is located. The pin is carried at one end of a lever 100 vertically pivoted to turn about an upstanding shaft 102 erect on the base 52. The other end of the lever 100 has secured thereto a cam face 104 in the shape of a vertically inclined flat surface on which a roller follower 106 rides. Said follower is journalled at one end of a rocking bar 108 fulcrumed to turn about a horizontal pin 110. The bar is pivotally joined as at 112 (see Fig. 3) at the end thereof opposite the follower 106 to a vertical link 114, the upper end of which terminates in a yoke 116 swivelled on a ball 118 extending laterally from a walking beam 120. Said beam is pivoted for horizontal rotation on a pin 122 mounted between a pair of uprights 124 carried by an arm 126 extending forwardly and upwardly extending from the base 52.

The rear end of the beam is actuated through a link 128 from a foot treadle (not shown) through a reversing lever of the usual type so that when an operator steps on said treadle the link 128 will rise and the rear end of the beam 120 accordingly will be elevated. This will lift the link 114 and raise the adjacent end of the bar 108 thereby depressing the follower 106 and oscillating the lever 100 about its fulcrum shaft 102 in a clockwise direction, indicated by the arrow D, as viewed in Fig. 1. Thereby, the pin 98 will shift the driven half 70 of the clutch away from the driving half 72 to uncouple the clutch and take power off the cementing drum 58. Due to the friction between the meshing gears 86, 88 and the friction of the shafts 64, 56 in their bearings said drum will quickly stop.

At its forward end the arm 126 is provided with a pair of vertical gibs 130 between which a ram 132 is mounted for vertical reciprocation being held in the slot of which the gibs define the side walls by face plate 134. The upper ends of the ram is connected through a link 136 to the forward end of the beam 120 so that when the foot treadle is depressed the ram will be driven downwardly.

The ram is lined up directly over the cementing drum (see Fig. 2) and its lower end is concavely contoured to match the curvature of the periphery of said drum (see Fig. 4). Accordingly when the ram is lowered by depression of the foot treadle the bottom end of the ram ultimately will come to rest on the top of the cementing drum.

A feed plate 138 is provided at the end of a bracket 140 mounted on the arm 126. The top of the feed plate is horizontal and is slightly above the level of the top of the cementing drum (see Fig. 2). Said feed plate provides a wide surface for support of the long tapes 34, 36. The upper surface of the feed plate is provided with a slot 142 (see Fig. 1) perpendicular to the cementing drum and in line with the axis of rotation thereof. Said slot is included to accommodate the beaded edges 38 of said tapes and the slide fastener elements secured thereon, thereby allowing the tapes to lie flat on the feed plate while the elements slide along the bottom of the slot (see Fig. 5).

In addition to the feed plate 138 there further is provided for the support of the long coupled strips an elongated horizontal take-off plate 144 supported by pedestals 146 from the base 52. The take-off plate likewise includes a long slot 148 slidably to pass the coupled slide fastener elements. It thus will be seen that when the long strips are supported on the two plates the tapes will cross over the top of the cementing drum (see Fig. 2).

To use the machine 30, an operator lays the coupled strips across the two plates in the position indicated in Fig. 2 and places the zones 46, 48 directly above the cementing drum so that the stripe 50 ultimately will be located thereon in the correct position. To ensure exact orientation of the tapes in the foregoing position the machine further includes a locating pin 150 carried by the feed plate 138 and extending vertically a short distance in front of the same as clearly indicated, for instance, in Fig. 5. The locating pin is disposed along the line of the slots 142, 148 so that it will lie between a pair of tapes carried by the two plates. The pin is so placed that when it is butted against by the endmost slide fastener element of a pair of coupled groups of such elements the area on which cement is to be imprinted will lie directly between the ram 132 and the cementing drum 58.

After the operator has thus arranged the pair of long strips he steps on the foot treadle. The first consequence of this action is to disengage the clutch halves 70, 72 and stop the cementing drum. Further depression of the treadle presses the pair of tapes between the cementing drum and the lower end of the ram as indicated in Fig. 6 thereby depositing liquid cement in the desired area. To accommodate the beaded edges of the tape during the cementing operation the lower end of the ram is formed with a clearance slot 152.

It will be appreciated that by continuously driving the cementing drum, except at the moment of application of cement as a band across the coupled strips, a fresh film of cement always is provided at the top of the cementing drum continuously ready for application to the strips.

The second machine, which is denoted by the reference numeral 160, is shown on sheets 3, 4 and 5 in Figs. 10, 11 and 13–19. Referring to these sheets and figures it will be seen that said machine constitutes a die set 162 mounted in a conventional press 164 which is equipped with suitable mechanisms for actuating the die set.

The die set essentially constitutes an anvil 166 and a cooperating set of upper dies 168. Understanding of the construction and operation of the anvil and upper dies will be expedited if the different upper dies and the cooperating parts of the anvil are individually described and such procedure will be adopted in the following portion of this specification.

First, however, it will be observed that the press 164 constitutes a bed 170 from which throat plates 172 extend upwardly to carry an elevated horizontal operating shaft 174. This shaft is conventionally driven as by a belt 176 trained about a fly-wheel 178 on the shaft, the belt being constantly driven by an electric motor (not shown). A standard one-revolution clutch 180 mounted on the fly-wheel is designed to engage or disengage the fly-wheel and shaft in the usual manner. Said clutch is controlled by a trip finger 182 that is actuated through a kinematic linkage 184 and rod 186 from a foot treadle (not shown) so that when the foot treadle is depressed by an operator the trip finger engages the clutch 180 which thereupon turns the shaft 174 through 360° and then disengages itself automatically.

The shaft 174 carries an eccentric 188 on which the gudgeon end 190 of a connecting rod 192 is journaled. Said connecting rod is linked to a vertically reciprocal ram 194 which rides on slide journals 196 conventionally furnished with the press. The ram carries a hold-down die 198 which is one of the upper dies 168. Said hold-down and sealing die consists of a block 200 furnished on one side face 202 (see Fig. 19) with a pair of vertical slots 204 in each of which a hold-down pin 206 is non-rotatably slidable. The upper end of each hold-down pin is provided with a forwardly extending finger 208 that passes through a slot 210 in a cover plate 212 overlying the side face 202 of the block 200. The slot 210 is somewhat narrower than the slot 204 so that the pins are captively retained in the block 200. A tension spring 214 is secured at one end to a finger 208 and at its other end to a stationary lug 216 carried by the plate 212 whereby the hold-down fingers 206 are biased downwardly with respect to the block 200 but can experience upward movement relative thereto. Downward movement of the pins is limited by engagement of the finger 208 with the bottom of the slots 210.

In the back of each of the hold-down fingers the block is furnished with a pendent sealing abutment 218. Said abutment has a flat horizontal lower end the purpose whereof will become apparent as the description proceeds. In their lowermost positions (see Fig. 18) the bottoms of the pins are lower than the bottom of the abutment.

The hold-down pins and abutment are located directly above an upper flat portion 220 of the anvil 166 on which flat portion there is adapted to be placed the next to the endmost pair of coupled stringers of a pair of long coupled strips of such stringers.

The anvil 166 further includes a stationary folding block 222 which is located at one side of the flat portion 220 and extends above said portion. The block is provided with a horizontal slot 224 extending in a rearward direction from the front of the machine and having its lower horizontal side wall coextensive with the horizontal portion 220 of the anvil. The bottom of the slot is, as clearly can be seen, vertical and the other side wall of the slot is spaced above the horizontal anvil portion 220. The slot faces toward the side of the machine from which the strips to be operated upon are fed.

Immediately to the side of the folding block 222 opposite to that on which the slot 224 is formed is a stationary cutting blade 226.

The foregoing three parts, to-wit, the horizontal portion 220, the folding block 222 and the stationary cutting blade 226 constitute the principal parts of the anvil 166.

To fold the previously cemented sections 46, 48 on one another the machine 160 utilizes a folding blade 228 having a chamfered forward thin folding edge 230. This blade is secured to a mounting block 232 that is fastened to a folding lever 234 journalled for horizontal rotation about a post 235. For facilitating adjustment of the angular orientation of the folding blade the block 232 is provided with a rearwardly extending pin 236 (see Fig. 10) which is accommodated in the slotted end of the lever 234. A bolt 238 bridges the slot in order to draw the two sides thereof together and clamp the pin 236 in any adjusted angular position. It may be mentioned at this point that the preferable position of the pin is one in which the folding blade is just a few degrees, e.g. 20°, above the horizontal when in its operative folding position illustrated in Fig. 16.

A cam 240 secured to the operating shaft 174 is employed to actuate the folding lever 234. Said cam engages a roller follower 242 journaled on a shaft 244 that is carried by a slide rod 246 vertically reciprocal in a channel 248 that is carried by one of the throat plates 172. The slide rod is biased upwardly, so that the roller 242 will follow the cam 240, by a tension spring 250 anchored at its upper end to said throat plate and at its lower end to a pivoted lever 252 having an edge bearing against the under side of a roller 254 rotatable on the shaft 244.

The slide rod 246 has a lower slotted end in which a pin 256 is caught, being held there by a bolt 258 which squeezes the sides of the slot together. The pin 256 serves as a connection between the slide rod and a yoke block 260 in which a roller 262 is journaled for rotation about a horizontal axis. Said roller is arranged to bear against the upper edge of the folding lever 234 which is urged upwardly by a spring 264 maintained under tension between the folding lever 234, and a bracket 266 high on the aforesaid throat plate.

It now will be apparent that as the shaft 174 rotates it will first depress the slide rod and then release the same for upward movement. As the slide rod moves down it will swing the folding lever 234 counterclockwise as viewed in Fig. 15 so that the chamfered edge of the folding blade oscillates toward the slot 224 of the folding block 222. Changing the orientation of the yoke block 260 permits the timing of the folding operation to be finely adjusted.

A cam 268 controls the severing operation of the machine 160. Said cam engages a roller follower 270 mounted on the tip of an oscillating lever 272. Said lever is fixed to a horizontal shaft 274 that is biased to turn in a counter-clockwise direction as viewed in Fig. 10 by a spring 276 that is tensioned between the base of the machine and a lever 278 fixed on the shaft 274.

The shaft 274 further has secured thereon a cutting lever 280 (see Fig. 13) at the forward end of which is provided a roller 282. Said roller sides on the upper edge of a rocking cutting blade 284. The rocking cutting blade is located alongside the stationary cutting blade 226, being biased toward the same by a spring 286. The rocking cutting blade is pivoted on a pin 288 adjacent the back of the stationary cutting blade. Thus will be clear that each time the shaft rotates once the oscillating cutting blade first will be brought down and then will be permitted to raise up again, the severing action being a quick one determined by the sharpness of the node 290 on the cam 268.

The machine is provided with a locating pin 292 extending upwardly from the flat anvil portion 220 adjacent the side of the anvil from which the long coupled strips are fed into the machine 160.

To use said machine, an operator lays the next to the endmost pair of coupled stringers on a pair of long strips on a ramp 294 at the entrance side of the machine. The foremost element of the coupled groups of slide fastener elements forming part of the next to the endmost pair of coupled stringers is butted against the locating pin 292 and the endmost pair of coupled stringers is pulled toward the exit side of the machine thus tensing the tapes from the pin 292 rightwardly as seen in Fig. 15. The gap between these two pairs of stringers is bridged over the top of the folding block 222 and extends through the next now open severing blades (see Fig. 15), the stationary severing blade 226 being at substantially the same horizontal level as the top of the folding block. The endmost pair of coupled stringers is at this time still an integral part of the pair of long strips. However, in a previous cycle of operations in the machine 160 it has had the bottom ends of its tapes doubled and cemented.

With the stringers and tapes in the position just described the operator steps on the foot treadle to engage the clutch 180 and cause the operating shaft 174 to turn through a single complete revolution. The timing of the various operating mechanisms is such that the hold-down pins 206 first engage the tapes of next to the foremost pair of coupled stringers pressing said tapes against the horizontal portion 220 of the anvil to the front and back of the locating pin 292. Thereupon the rocking severing blade 284 descends and cuts the foremost pair of coupled stringers away from the strips so that it is ready for attachment of the pins. At this time the now foremost pair of coupled stringers which still have not yet had their ends folded and doubled are maintained in position by the hold-down pins.

Next the folding blade 228 which initially was in the position shown in Fig. 15 swings toward the position indicated in Fig. 16 in which the forward edge 230 thereof enters the slot 222. This causes the bottom ends of the tapes of the now foremost pair of coupled stringers to become folded as clearly seen in Fig. 16.

It may be observed that said forward edge 230 of the folding blade 228 is formed with a pair of inwardly extending slots 296 (see Fig. 10) to permit the folding blade to move to its operative position indicated in Fig. 16 while the hold-down pins are pressing the tapes against the anvil.

The folding blade now retracts, as shown in Fig. 17, while the ram 194, which at the start of the cycle initiated its downward movement, continues to move downwardly as indicated by the arrow E. After the folding blade is out of position the continued downward movement of the ram brings the abutment 218 against the folded tape portions and presses and seals the tape portions 46 against the top portion 48 as indicated in Fig. 19 to double the tape ends. The hold-down pins remain in engagement with the tapes during this last step being telescopically received within the slots 204.

Thereafter, the ram moves back upwardly, the upper severing blade 284 retracts to idle position as shown in Fig. 13, the folding blade having swung back to its upper elevation indicated in Fig. 15, and the one revolution clutch 180 trips out leaving the machine ready for performance of a fresh cycle of operations.

The finished tapes with the folded-over ends are illustrated in Fig. 12. It will be apparent that when the abutment 218 presses the tape sections 46 against the sections 48 the previously applied stripe 50 of cement will cause these two sections to become permanently joined to one another. It also will be observed that the severing operation performed in the machine 160 is at the boundary line between the sections 44, 46 of the tapes in the gap 42.

The third machine which is denoted by the reference numeral 300 is shown in Figs. 20–27 on sheets 6 and 7. This machine, as indicated heretofore, is designed to attach on the beaded edges of the double bottom ends of the stringers pins which either are designed to support a socket or to constitute the male pin of a separable bottom stop.

A typical pin 302 is illustrated in Fig. 27. Said pin, which is of conventional construction, constitutes an elongated narrow bottom wall 304 from which there extend divergent side walls 306, 308 that terminate at their free edges in inturned serrated flanges 310. Thus in section the pins prior to attachment to the bottom folded ends of stringer tapes are of roughly U-shaped cross-section and are asymetrical about a median plane parallel to the bottom wall and half way between the top and bottom of the pin. Moreover, an unattached pin is axially asymmetrical being provided at its bottom end with an upturned closure lug 312 and at its top end with an axial extending boss 314 that constitutes a longitudinal extension of the bottom wall. Optionally, the bottom wall may be downwardly offset as at 316 as is conventional in pins for separable bottom stops. From the foregoing it will be appreciated that the bottom and top ends of the pin are basically dissimilar and that the two sides of the pin represented by the bottom wall and the spaced serrated flanges are basically dissimilar.

The machine 300 includes a positioning means (not shown) for holding the doubled bottom ends of a pair of coupled stringers in predetermined position and for placing pins 302 over the beaded edges of these doubled ends. The machine further includes a clamping means (not shown) for closing the divergent side walls 306, 308 of the pins about the beaded edges and for clamping the serrated flanges against opposite sides of the tape immediately in back of the beaded edges, all of the foregoing means being conventional.

Unattached pins, such as the pin 302, are fed in a mass into the machine 300, the pins being disposed in random orientation. Said machine 300 avoids the necessity of having an operator pick up one pin at a time and slide it into a chute to be fed into the positioning and clamping means hereinabove described. More specifically, this is accomplished in said machine by the provision of a hopper 318.

Said hopper comprises a flat plate 320 which is slightly tilted from the vertical as shown in Fig. 20. The plate has a large opening 322 at its top through which unattached pins are fed into the hopper on a slide 324.

A shaft 326 journaled in the plate 320 (see Fig. 22) is continuously rotated as by means of a sheave 328 fixed to the shaft and having trained about it a belt 330 driven by an electric motor (not shown). The outer end 332 of the shaft is of non-circular configuration and engages a matching central opening 333 in a drive plate 334 having a friction facing 335. Said facing rests on the flat narrow end of a conical magazine bell 336 having a central bore 338 which is apertured to pass the shaft 326. A spring 340 is held under compression between the plate 334 and a wing nut 342 so that said plate is forced against the bell. Accordingly, when the shaft 326 turns it will rotate the plate 334 and the plate through a friction coupling will turn the bell 336. This prevents destruction of any parts handled by the bell in the event of jamming. As the bell turns unattached pins introduced into the hopper will fall against the lower portion of the bell where they will be churned between said bell and the plate 320.

The wide inner end of the bell is formed with a rim 344 which bears against a wear disc 346 on the surface of the plate 320 on which the bell is located. The underside of the rim of the bell is formed with several radially off-set channels 348 having a width and depth sufficiently great to pass unattached pins 302 moving axially therethrough. Preferably, the channels converge from both ends toward a narrow central waist 350 slightly wider than an unattached pin 302.

The waist of each channel is partially obstructed by a discriminating pin 352 carried by the rim of the bell and extending into the channel in a direction toward the wear plate 346. Said pin protrudes into the channel a distance such that the space between the tip of the pin and the wear plate is slightly less than the height of an upturned closure lug 312. Moreover, the space between the sides of each pin and the adjacent walls of the associated channel 348 is sufficiently great at each side of the pin to easily pass a side wall 306 or 308 of the pin as well as an inturned serrated flange 310. However, this space is not wide enough to permit an entire unattached pin 302 to pass to either side of the pin 352.

It now will be apparent that as the bell rotates some unattached pins 302 will fall into the channels 348 as they move beneath the bottom of the jumbled mass of such pins in the hopper. This entry is facilitated by the flaring entrance mouth 354 of the channels.

Thereafter, as the channel in which a pin 302 lies moves upwardly the pin will descend by gravity through the channel. However, depending upon its orientation, it may be unable to pass the discriminating pin 352.

If the bottom end of a pin 302 enters a channel first, as shown in Fig. 25, the lug 312 will prevent further movement of said pin 302 through the channel and as the bell continues to turn a position ultimately will be reached, when said pin 302 is above the shaft 326, at which time the pin will fall back into the jumbled mass.

If the top end of a pin 302 enters first into a channel 348 its passage through the channel only will be blocked by the discriminating pin if the bottom wall 304 of the pin 302 rides on the bottom (closed side) of the channel 348 whereupon the protuberance 314 will strike the pin 352 and prevent further movement of the pin 302 through the channel. This pin 302 likewise later will fall out of the channel when it reaches the top of the bell.

However, if a pin 302 enters a channel 348 with its bottom wall 304 riding on the wear plate 346 it will be able to move part way past the discriminating pin 352; that is to say, its side walls 306, 308 and flanges 310 will ride past the sides of the discriminating pin and its bottom wall 304 will slide beneath the tip of the discriminating pin. However, movement through a channel of an unattached pin 302 so oriented still will be checked inasmuch as eventually the lug 312 will strike the discriminating pin.

To permit further movement of an unattached pin 302 so properly oriented, in a channel 348, the wear plate 336 is formed with a recess 356 concentrically located about the shaft 326 (see Fig. 21). The recess is of tapering cross-section (see Fig. 25), having its deepest end beneath the waists 350 of the channels 348 and slightly radially inwardly thereof as clearly is indicated in Figs. 21, 22, 24 and 25. The recess tapers back to the normal surface of the wear plate 346 in a radially outward direction. By virtue of this construction when the lug 312 of a properly oriented unattached pin 302 strikes the discriminating pin 352 (as shown in dotted lines in Fig. 24), the unattached pin, due to the outward tilting of the plate 320, will fall away from the discriminating pin 352 to the solid line position shown in Fig. 24, with the bottom end of the pin 302 moving through a distance equal approximately to the height of the lug 312. When the unattached pin is thus positioned in the recess 356 it can continue to slide through the channel 348 in which it is disposed beneath the discriminating pin 352.

The channels 348 are shaped so that at this time one side wall of the unattached pin 302 will ride on a side wall of the channel 348 being guided to an almost vertical position at the zone where it reaches the entry end 358 of a gravity chute 360 through which a stacked line of properly oriented unattached pins 302 are led to the positioning and clamping means heretofore described.

Certain features of the machines shown and described but not claimed herein are shown, described and claimed in my co-pending applications Serial Nos. 848,674 and 848,673, both filed on October 26, 1959, and both bearing the title Method and Apparatus for Making Separable Bottom Stops for Slide Fasteners.

From the foregoing it will be appreciated that there is provided a system which achieves the various objects of the invention and is well adapted to meet the conditions of practical use.

As various possible embodiments might be made of the instant invention and as various changes might be made in the embodiment above set forth, it is to be understood that all matter herein described or shown in the accompanying drawings is to be interpreted as illustrative and not in a limiting sense.

Having thus described my invention, I claim as new and desire to secure by Letters Patent:

1. In a machine for attaching to the bottom ends of coupled stringers pins for a separable bottom stop each of which pins constitute an elongated bottom wall, upstanding side walls, inturned flanges spaced from one another and extending from the upper edges of the side walls, and a closure member at one end only of the bottom wall, that improvement comprising the combination of: an inclined plate, a bell mounted to turn on said plate and having its rim immediately adjacent the same, said plate being provided with an opening for admitting to the space between the bell and plate a mass of randomly disposed bottom stop pins, said rim having channels on the surface thereof adjacent the plate, said channels extending in a generally radial direction from the interior to the periphery of the bell and being wide enough to pass a bottom stop pin moving axially therethrough, a plurality of discriminating pins carried by the bell, each of said pins being located in a different one of said channels and having its tip within the channel, the space between each discriminating pin and each side of its associated channel being less than the width of the bottom stop pin, said discriminating pin being narrower than the space between said flanges, said plate being provided with a recess below the center of rotation of the bell and adjacent the path of travel of the discriminating pins, the uppermost end of said recess being located slightly higher than said path of travel a distance considerably less than the length of a bottom stop pin, whereby a bottom stop pin travelling axially through a channel with the closure member rearmost and the bottom wall of the bottom stop pin remote from the bottom of the channel will be checked in its movement through the channel by abutment of the discriminating pin against the closure member after the remainder of the bottom stop pin has passed the discriminating pin and thereafter will at least in part fall into said recess to permit further travel of the bottom stop pin through the channel to leave the bell.

2. A combination as set forth in claim 1 wherein the channels converge inwardly from both ends toward the waist at which the discriminating pin is located.

3. A combination as set forth in claim 1 wherein the recess is arcuate and concentric with the axis of rotation of the bell and further wherein said recess is wedge-shaped with its deep end close to said axis of rotation and its shallow end remote therefrom.

4. A combination as set forth in claim 1 wherein the discriminating pins are located over the recess.

References Cited in the file of this patent

UNITED STATES PATENTS

| | | |
|---|---|---|
| 1,210,237 | Walker et al. | Dec. 26, 1916 |
| 1,444,082 | Poeppel | Feb. 6, 1923 |
| 1,549,519 | Stimpson | Aug. 11, 1925 |
| 1,859,101 | Lyons | May 17, 1932 |
| 2,154,899 | Gualtiers | Apr. 18, 1939 |
| 2,154,943 | King | Apr. 18, 1939 |
| 2,388,405 | Glaude | Nov. 6, 1945 |
| 2,511,414 | Poux | June 13, 1950 |
| 2,521,110 | Wixon et al. | Sept. 5, 1950 |
| 2,597,613 | Brewer | May 20, 1952 |
| 2,623,214 | Yaffe | Dec. 30, 1952 |
| 2,702,067 | Goldberg | Feb. 15, 1955 |
| 2,756,805 | Silverman | July 31, 1956 |

FOREIGN PATENTS

| | | |
|---|---|---|
| 529,684 | Germany | July 16, 1931 |
| 585,662 | Germany | Oct. 6, 1933 |